(12) United States Patent
Keiser et al.

(10) Patent No.: US 9,017,649 B2
(45) Date of Patent: Apr. 28, 2015

(54) METHOD OF STABILIZING SILICA-CONTAINING ANIONIC MICROPARTICLES IN HARD WATER

(75) Inventors: Bruce A. Keiser, Naperville, IL (US); Raymond D. Miller, Jr., Carol Stream, IL (US); Linda S. Strysik, Crest Hill, IL (US); David A. Grattan, Bolingbrook, IL (US)

(73) Assignee: Nalco Company, Naperville, IL (US)

( * ) Notice: Subject to any disclaimer, the term of this patent is extended or adjusted under 35 U.S.C. 154(b) by 1942 days.

(21) Appl. No.: 11/389,756

(22) Filed: Mar. 27, 2006

(65) Prior Publication Data

US 2007/0224146 A1    Sep. 27, 2007

(51) Int. Cl.
*A61K 8/89* (2006.01)
*A61K 8/81* (2006.01)
*C01B 33/148* (2006.01)
*C09C 1/30* (2006.01)
*D21H 17/68* (2006.01)
*D21H 21/10* (2006.01)

(52) U.S. Cl.
CPC .......... *C01B 33/1485* (2013.01); *C01P 2006/12* (2013.01); *C09C 1/3072* (2013.01); *C09C 1/309* (2013.01); *D21H 17/68* (2013.01); *D21H 21/10* (2013.01)

(58) Field of Classification Search
CPC ..... C01B 33/1485; D21H 17/68; D21H 21/10
USPC ........................... 424/70.12, 70.16
See application file for complete search history.

(56) References Cited

U.S. PATENT DOCUMENTS

| 4,643,801 A * | 2/1987 | Johnson ............... 162/164.1 |
| 4,795,531 A * | 1/1989 | Sofia et al. .............. 162/164.6 |
| 5,006,311 A | 4/1991 | Hoots et al. |
| 5,032,227 A * | 7/1991 | Derrick et al. ............. 162/168.1 |
| 5,200,105 A * | 4/1993 | Cuisia .............................. 252/180 |
| 5,277,823 A * | 1/1994 | Hann et al. ..................... 210/696 |
| 6,083,997 A | 7/2000 | Begala et al. |
| 6,103,064 A | 8/2000 | Asplund et al. |
| 6,270,627 B1 | 8/2001 | Keiser et al. |
| 6,379,500 B2 | 4/2002 | Greenwood et al. |
| 6,673,208 B2 | 1/2004 | Persson et al. |
| 6,838,002 B2 * | 1/2005 | Zeiher et al. .................. 210/650 |
| 2003/0139517 A1 | 7/2003 | Nyander et al. |

FOREIGN PATENT DOCUMENTS

| WO | 9916708 A1 | 4/1999 |
| WO | 0075074 A1 | 12/2000 |
| WO | 0144573 A1 | 6/2001 |
| WO | 03056099 A1 | 7/2003 |

OTHER PUBLICATIONS

Zahid Amjad et al "Factors Influencing the Precipitation of Calcium-Inhibitor Salts in Industrial Water Systems" Publication of the Association of Water Technologies, Inc, Noveon Good-Rite® K-700, Water Treatment Polymers, Sep. 2003.

* cited by examiner

*Primary Examiner* — Johann R Richter
*Assistant Examiner* — Courtney Brown
(74) *Attorney, Agent, or Firm* — Benjamin Carlsen

(57) ABSTRACT

A method of stabilizing silica-containing anionic microparticles upon mixing of the silica-containing anionic microparticles with hard water comprising adding one or more hardness-abating additives to the hard water prior to mixing of the hard water and the silica-containing anionic microparticles; or adding an effective stabilizing amount of one or more hardness-abating agents to the silica-containing anionic microparticles prior to mixing of the hard water with the silica-containing anionic microparticles and a stabilized composition comprising silica-containing anionic microparticles and an effective stabilizing amount of one or more hardness-abating additives.

6 Claims, No Drawings

METHOD OF STABILIZING SILICA-CONTAINING ANIONIC MICROPARTICLES IN HARD WATER

TECHNICAL FIELD

This invention relates to the use of silica-containing anionic microparticles in papermaking. More particularly the invention concerns methods of using hardness-abating additives to prevent gelation or precipitation of the microparticles in hard water and stabilized compositions comprising silica-containing anionic microparticles and hardness-abating additives.

BACKGROUND OF THE INVENTION

Silica-containing anionic microparticles are used as part of retention and dewatering programs in the production of paper and board products. In the paper making process, these particles are added to the flowing stock containing cellulose fibers, fillers, clays, dyes, starches, coagulants, anionic trash catchers (ATC's) and other additives, either before or after the addition point of a high molecular weight flocculant. Before products comprising the silica-containing anionic particles are added to the stock, the product is diluted with process or fresh water. This dilution may be on a volume basis and can range from about 25 to about 200-fold, i.e. one gallon of silica-containing anionic microparticle-containing product may be mixed with from 25 to 200 gallons of water.

It is known that silica-containing anionic microparticles can gel or precipitate as a result of this dilution depending on the hardness of the dilution water. This gelation or precipitation of the microparticle results in reduced retention and dewatering performance thereby requiring higher dosages and correspondingly increased material costs to achieve the desired level of performance. Production may also be interrupted in order to remove gel from the piping and dilution system. Fluctuations in the dilution water quality can also lead to variation in program performance and product quality as a result of swings in retention and drainage. In order to obviate the foregoing problems, producers have been forced to employ costly water treatment to reduce water hardness prior to use as a diluent for silica-containing anionic microparticle products. Accordingly, there is an ongoing need for compositions and methods for stabilizing silica-containing anionic microparticles against gelation or precipitation where hard water must be used in papermaking processes.

SUMMARY OF THE INVENTION

This invention is a method of stabilizing silica-containing anionic microparticles upon mixing of the silica-containing anionic microparticles with hard water comprising adding one or more hardness-abating additives to the hard water prior to mixing of the hard water and the silica-containing anionic microparticles; or adding an effective stabilizing amount of one or more hardness-abating agents to the silica-containing anionic microparticles prior to mixing of the hard water with the silica-containing anionic microparticles.

In another aspect, this invention is a stabilized composition comprising silica-containing anionic microparticles and an effective stabilizing amount of one or more hardness-abating additives.

Use of the hardness-abating additives described herein permits dilution of silica-containing anionic microparticle products with water having a hardness of up to about 1200 ppm as calcium carbonate without formation of gel or precipitate.

DETAILED DESCRIPTION OF THE INVENTION

This invention uses inorganic, organic or polymeric water hardness abating additives to stabilize silica-containing anionic microparticles against gelation or precipitation upon mixing of the microparticles with hard water. The additives may be added to the water prior to mixing of the water with the microparticles or can be added to the microparticles prior to mixing with the water.

As used herein "stabilize" and "stabilization" means inhibiting or preventing gelation or precipitation of silica-containing anionic microparticles resulting from dilution of silica-containing anionic microparticle products with hard water.

For purposes of this invention, water hardness is defined as the sum of the polyvalent cations dissolved in the water. See "The Nalco Water Handbook", ed. Frank N. Kemmer, Chp. 4-1, McGraw-Hill Book Company, New York, 1979. The most common such cations are calcium and magnesium, although iron, strontium, and manganese may contribute (AWWA, 1990; EPA, 1986). Hardness is usually reported as an equivalent quantity of calcium carbonate ($CaCO_3$). Generally, waters are classified according to degree of hardness (EPA, 1986). The hardness of the water will be reported in grains per gallon, milligrams per liter (mg/l), or parts per million (ppm). One grain of hardness equals 17.1 mg/l or ppm of hardness.

The water hardness abating additives are suitable for stabilizing silica-containing anionic microparticles in water having a hardness of at least about 60 ppm as calcium carbonate, however, are advantageously used when the dilution water has a hardness of greater than 180 ppm as calcium carbonate.

Silica-containing anionic microparticles suitable for stabilization in hard water using the additives of this invention include, but are not limited to colloidal silica, polysilicate microgels, colloidal silicic acid, aluminum-modified colloidal silica, polyaluminumsilicate microgels, colloidal aluminosilicic acid, colloidal aluminosilicate, colloidal zeolites (both naturally occurring and synthetic), natural and synthetic phyllosilicates such as bentonite, montmorillinite, hectorite and the like. Phyllosilicates are also known as "sheet silicates" and are defined herein as natural or synthetic minerals in which all the $SiO_4$ tetrahedra share corners with three others, thus forming extended layers or sheets. }Other anionic cross-linked microparticles, such as Polyflex® CP, available from Ciba Specialty Chemicals, Basel, Switzerland, will also benefit from this invention.

For purposes of this invention, microparticle is defined as any material which has at least one of its dimensions in solution in the nano-size range, i.e. less than 1 micron. These are materials whose particle size is generally in the colloidal range. For example, colloidal silica referred to as nanoparticles is composed of primary particles whose diameter is less than 1 micron, preferably less than 500 nm and more preferably less than 100 nm. It should be understood, however, that these primary particles can be aggregated by way of manufacturing and still be considered microparticles. Other examples are the natural and synthetic phyllosilicates that have at least one characteristic dimension within the nanometer range, e.g. a platelet thickness of about 10 nm. Representative phyllosilicates include bentonite, montmorillinite, laponite, hectorite, and the like.

"Product" means any commercial product comprising anionic silica-containing microparticles. Typically, the anionic silica-containing microparticles comprise from about 5% to 100% by weight of the product. The physical form of the commercial offering may be as a free flowing powder or a dispersion in water. Silica-containing anionic microparticle products are available, for example, from Nalco Company, Naperville, Ill.; Eka Chemicals AB, Bohus, Sweden; Akzo Nobel, Arnheim, Netherlands or Eka Chemicals, Inc., Marietta, Ga. as Compozil® or nanoparticles; Ciba Specialty Chemicals, Tarrytown, N.Y. as Hydrocol®, Particol®, TelioForm®, or PolyFlex®; Kemira Oyj, Helsinki, Sweden as Fennosil®; Buckman Laboratories International, Inc., Memphis, Tenn. as Mosaic® (MP Series); and Hercules Incorporated, Wilmington, Del. as colloidal silica. These are provided as examples but are not meant to limit the definition in any way.

Combinations of these materials will obviously benefit whether they are fed separately or in a combined stream to the papermaking stock. The addition point to the stock can be at any place beginning with the stock chest through and including the dilution water to the headbox. This would include addition to the headbox. The addition can be at one spot or split among several addition points. These anionic particulates can also be combined with other materials such as naphthalene sulfonate formaldehyde or other low molecular weight nitrogen-containing organics. Representative patent documents disclosing the preparation and use of anionic microparticles in papermaking are listed below.

monomers include acrylic acid, methacrylic acid, AMPS, styrene sulfonic acid, vinyl sulfonic acid and base addition salts thereof.

"Base addition salt" means the salt resulting from reaction of a carboxylic acid (—$CO_2H$) and/or other "acid" groups such as sulfonic acid or phosphonic acid groups with a suitable base such as the hydroxide, carbonate, or bicarbonate of a metal cation or tetraalkylammonium cation, or with ammonia, or an organic primary, secondary, or tertiary amine of sufficient basicity to form a salt with the carboxylic acid group. Representative alkali or alkaline earth metal salts include sodium, lithium, potassium, calcium, magnesium, and the like. Representative organic amines useful for the formation of base addition salts include, ethylamine, diethylamine, ethylenediamine, ethanolamine, diethanolamine, piperazine, and the like. Preferred base addition salts include the sodium and ammonium salts.

"Nonionic monomer" means a monomer that is electrically neutral. Representative non-ionic, water-soluble monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, and the like. Preferred nonionic monomers include acrylamide, methacrylamide and vinyl acetate.

| | | | |
|---|---|---|---|
| U.S. Pat. No. 6,372,089 | US 20030139517 A1 | U.S. Pat. No. 6,712,934 | U.S. Pat. No. 6,475,341 |
| U.S. Pat. No. 6,372,806 | US 20030192664 A1 | U.S. Pat. No. 6,391,156 | US 20050161183 A1 |
| U.S. Pat. No. 6,083,997 | US 20030136534 A1 | U.S. Pat. No. 6,358,365 | US 2003025103 A1 |
| U.S. Pat. No. 6,486,216 | US 2002370653 P | U.S. Pat. No. 6,395,134 | US 2005170109 A1 |
| EP 0656872 | US 20040149407 A1 | U.S. Pat. No. 6,379,501 | 6,906,109 B2 |
| EP 0041056 | U.S. Pat. No. 6,524,439 | U.S. Pat. No. 6,454,902 | 6,747,065 B1 |
| EP 0502089 | US 20040250972 A1 | U.S. Pat. No. 6,616,806 | US 2005061462 A1 |
| U.S. Pat. No. 5,643,414 | EP 1620599 | U.S. Pat. No. 6,274,112 | US 2003136534 A1 |
| U.S. Pat. No. 5,603,805 | US 20040238137 | U.S. Pat. No. 6,379,500 | US 2005228057 |
| U.S. Pat. No. 5,374,335 | EP 1456469 | EP 1181245 | US 2005228058 |
| U.S. Pat. No. 4,964,954 | EP 1456468 | EP 1181244 | US 2005279474 A1 |
| U.S. Pat. No. 4,388,150 | EP 1529133 | US 20020147240 | US 2005236123 A1 |
| U.S. Pat. No. 4,385,961 | US 20020198306 | US 20030024671 | US 2004229991 A1 |
| WO 2001064580 | US 20040149407 A1 | EP 1084295 | EP 1586704 A1 |
| WO 2001046072 | U.S. Pat. No. 6,551,457 | U.S. Pat. No. 6,355,141 | |
| US 20010004927 | U.S. Pat. No. 6,846,384 | US 20020139502 | |

In an embodiment, the hardness-abating additives are selected from anionic polymers having a weight average molecular weight up to about 3,000,000 daltons.

"Anionic polymer" means a polymer having a net overall negative charge. Anionic polymers are prepared by polymerizing one or more anionic monomers and optionally one or more nonionic monomers or by transamidation of polymers containing pendant amido groups with substituted amines containing sulfonate, carboxylate or other anionic groups such as those described in U.S. Pat. No. 4,752,443.

"Anionic monomer" means a monomer as defined herein which possesses a net negative charge above a certain pH value. Representative anionic monomers include acrylic acid, methacrylic acid, 2-acrylamido-2-methylpropanesulfonic acid (AMPS), vinyl sulfonic acid, styrene sulfonic acid, maleic acid, sulfopropyl acrylate or methacrylate or other water-soluble forms of these or other polymerisable carboxylic or sulphonic acids, sulfomethylated acrylamide, allyl sulfonate, itaconic acid, acrylamidomethylbutanoic acid, fumaric acid, vinylphosphonic acid, vinylsulfonic acid, allylphosphonic acid, phosphonomethylated acrylamide, and the like and base addition salts thereof. Preferred anionic In an embodiment, the anionic polymers are selected from the group consisting of acrylate/acrylamide copolymers, acrylate homopolymers, acrylate/methacrylate copolymers, methacrylate/acrylamide copolymers, methacrylate/styrene sulfonate copolymers, acrylate/styrene sulfonate copolymers, methacrylate/vinyl sulfonate copolymers and 2-acrylamido-2-methylpropanesulfonic acid sodium salt homopolymer and sulfomethylated polyacrylamide.

In an embodiment, the anionic polymers are selected from poly(acrylic acid sodium salt) having a molecular weight between about 1,000 and about 30,000 daltons, acrylic acid-styrene sulfonic acid sodium salt copolymer having a weight average molecular weight between about 1,000 and about 60,000 daltons and poly(2-acrylamido-2-methylpropanesulfonic acid sodium salt) having a weight average molecular weight up to about 3,000,000 daltons.

In another embodiment, the hardness-abating additives are selected from the group consisting of inorganic boron-containing species including, but not limited to borax (sodium tetraborate decahydrate), sodium tetraborate pentahydrate, silicoborate (the salt of silicic acid and boric acid), borosilicate, borates which are boric acid salts of such things as alkali metals or ammonium), boric acid ($H_3BO_3$) and borosalicylates.

In an embodiment, the inorganic boron containing species is sodium borate.

In another embodiment, hardness-abating additives are organic compounds selected from the group consisting of organic phosphonates, phosphates, carboxylic acids, dithiocarbamates, salts of any of the previous members, and any combination thereof.

"Organic phosphonates" means organic derivatives of phosphonic acid, $HP(O)(OH)_2$, containing a single C—P bond, such as HEDP ($CH_3C(OH)(P(O)(OH)_2)$, 1-hydroxy-1,3-propanediylbis-phosphonic acid $((HO)_2P(O)CH(OH)CH_2CH_2P(O)(OH)_2))$; preferably containing a single C—N bond adjacent (vicinal) to the C—P bond, such as DTMPA $((HO)_2P(O)CH_2N[CH_2CH_2N(CH_2P(O)(OH)_2)_2]_2)$, AMP $(N(CH_2P(O)(OH)_2)_3)$, PAPEMP $((HO)_2P(O)CH_2)_2NCH(CH_3)CH_2(OCH_2CH(CH_3))_2N(CH_2)_6N(CH_2P(O)(OH)_2)_2)$, HMDTMP $((HO)_2P(O)CH_2)_2N(CH_2)_6N(CH_2P(O)(OH)_2)_2)$, HEBMP $(N(CH_2P(O)(OH)_2)_2CH_2CH_2OH)$, and the like.

"Organic phosphates" means organic derivatives of phosphorous acid, $P(O)(OH)_3$, containing a single C—P bond, including triethanolamine tri(phosphate ester) $(N(CH_2CH_2OP(O)(OH)_2)_3)$, and the like.

"Carboxylic acids" means organic compounds containing one or more carboxylic ($CO_2H$) groups, preferably aminocarboxylic acids containing a single C—N bond adjacent (vicinal) to the C—$CO_2H$ bond, such as EDTA $((HO_2CCH_2)_2NCH_2CH_2N(CH_2CO_2H)_2)$, DTPA $((HO_2CCH_2)_2NCH_2CH_2N(CH_2CO_2H)CH_2CH_2N(CH_2CO_2H)_2)$, and the like and alkaline and alkaline earth metal salts thereof.

"Dithiocarbamates" include monomeric dithiocarbamates, polymeric dithiocarbamates, polydiallylamine dithiocarbamates, 2,4,6-trimercapto-1,3,5-triazine, disodium ethylenebisdithiocarbamate, disodium dimethyldithiocarbamate, and the like.

In an embodiment, the organic abating additives are selected from the group consisting of HEDP ($CH_3C(OH)(P(O)(OH)_2)$, DTMPA $((HO)_2P(O)CH_2N[CH_2CH_2N(CH_2P(O)(OH)_2)_2]_2)$ and DTPA $((HO_2CCH_2)_2NCH_2CH_2N(CH_2CO_2H)CH_2CH_2N(CH_2CO_2H)_2)$.

The effective stabilizing amount of hardness-abating additives can be empirically determined based on the hardness of the dilution water, the nature of the hardness-abating additives and the silica-containing anionic microparticle product used and whether the hardness-abating additive is added to the dilution water or mixed with the silica-containing anionic microparticle-containing product. It should be understood that "hardness-abating additives" encompasses a single additive and combinations of additives. When combinations of additives are employed, the additives may be formulated into a single composition, added simultaneously or added sequentially. In all instances the upper limit of additive dosage is the solubility limit of the additive in the dilution water.

More particularly, with regard to inorganic boron additives, the typical dosage for dilution water is at least about 2 ppm as boron, preferably at least about 3 ppm.

When the inorganic boron additive is added to the silica-containing anionic microparticle product to form a stabilized product, dosages are typically at least about 50 ppm, preferably at least about 200 ppm as boron.

The inorganic boron additive may be added either directly to the silica-containing anionic microparticle product, to the dilution water prior to mixing of the dilution water with the silica-containing anionic microparticle product. Water-soluble inorganic boron additives which are available in solid form may be dissolved in the diluent water, added to water-based silica-containing anionic microparticle products and mixed to allow solubilization of the additive or pre-dissolved in water prior to addition to the diluent water or the silica-containing anionic microparticle product. The concentration of the inorganic boron additive in the water premix will be dependent on the water solubility of the inorganic boron additive.

Organic and polymeric hardness-abating additives may be added to dilution water at a dosage of at least about 20 ppm, preferably at least about 50 ppm as actives.

Typical dosages of organic additives for stabilized silica-containing anionic microparticle product are at least about 1000 ppm, preferably at least about 4000 ppm.

The organic and polymeric additives can be added to the silica-containing anionic microparticle-containing product directly just prior to the addition of the dilution water. In this case, the organic additives can be added as received or diluted first. Also, the additives can be added to the dilution water directly. The concentration is dependent on the additive chemistry and the hardness of the dilution water. At least 20 ppm of the active should be present in the final diluted product. The organic additive may also be combined directly with the silica-containing anionic particle-containing product. The concentration of the organic additive in the silica-containing anionic microparticle-containing product should be at least 1000 ppm.

In another embodiment, this invention is a method using the detection of inert fluorescent tracers or any inherent fluorescence of the hardness abatement additive to monitor and control the hardness abatement additives. The method comprises adding one or more inert fluorescent tracers to the abatement additive; providing a fluorometer to detect the fluorescent signal of the inert fluorescent tracers; using the fluorometer to measure the inert fluorescent tracer in an amount ranging from about 5 ppt to about 1000 ppm; and using the measured fluorescence to monitor and/or control the amount of abatement additive(s) introduced into the papermaking process.

Applicants have uniquely discovered that the monitoring and/or controlling techniques described herein are faster, more sensitive, more comprehensive and/or more reliable than conventional techniques presently available, particularly where the monitoring methods of the present invention are employed on a substantially continuous basis.

The term "inert," as used herein refers to an inert fluorescent tracer that is not appreciably or significantly affected by any other chemistry in the system, or by other system parameters such as pH, temperature, ionic strength, redox potential, microbiological activity or biocide concentration.

It should be appreciated that a variety of different and suitable inert fluorescent tracers can be utilized in any suitable amount, number and application. For example, a single tracer can be used to monitor the concentration of the abatement additive. Hence, in an embodiment, inert fluorescent tracer monitoring of the present invention can be conducted on a singular, intermittent or semi-continuous basis, and preferably the concentration determination of the tracer in the stream is conducted on-site to provide a rapid real-time determination.

A variety of different and suitable types of compounds can be utilized as the inert fluorescent tracers. See, for example, U.S. Pat. No. 6,838,002, incorporated herein by reference.

In an embodiment, the inert fluorescent tracers are selected from 1,3,6,8-pyrenetetrasulfonic acid tetrasodium salt; 1,5-naphthalenedisulfonic acid disodium salt (hydrate); xanthylium, 9-(2,4-dicarboxyphenyl)-3,6-bis(diethylamino)-, chloride, disodium salt; 1-deoxy-1-(3,4-dihydro-7,8-dimethyl-2,4-dioxobenzo[g]pteridin-10(2H)-yl)-D-ribitol; fluorescein; fluoescein, sodium salt; 2-anthracenesulfonic acid sodium salt; 1,5-anthracenedisulfonic acid; 2,6-anthracenedisulfonic acid; 1,8-anthracenedisulfonic acid; and mixtures thereof.

As noted above, it should also be appreciated that certain abatement agents of the current invention exhibit fluorescence. In such cases, this inherent fluorescence of the abatement additive can be used for tracing and monitoring of the abatement additive in the absence of an inert fluorescent tracer.

The amount of inert fluorescent tracer to be added to the abatement additive should be such as to be effective without being grossly excessive and will vary with respect to a variety of factors including, without limitation, the monitoring method selected, the extent of background interference associated with the selected monitoring method, the magnitude of the expected tracer(s) concentration in the feed water and/or concentration, the monitoring mode (such as an on-line continuous monitoring mode), and other similar factors. The dosage of the inert fluorescent tracer typically includes an amount that is at least sufficient to provide a measurable concentration of the fluorescent agents in the process stream of at least about 5 ppt (one part per trillion), and preferably at least 1 part per billion ("ppb") or about 5 ppb or higher, such as, up to about 100 ppm or about 200 ppm, or even as high as about 1000 ppm.

The terms "tracing" and "monitoring" as used herein, unless expressly indicted otherwise, mean the determination of the concentration of the fluorescent agents in the abatement additive containing process stream. The tracing/monitoring can be conducted on a singular, intermittent or semi-continuous basis, and preferably the concentration determination is conducted on-site to provide a rapid real-time determination. In an embodiment, the fluorescent agents of the present invention are added to the abatement additive as a component of a formulation, rather than as a separate component, such as a dry solid or neat liquid.

In an embodiment, the present invention includes a controller to monitor and/or level of hardness abating additive in the method of this invention based on the measurable amount of inert fluorescent tracer(s). The controller can be configured and/or adjusted in a variety of different and suitable ways. For example, the controller can be in contact with a detection device to process the detection signal (e.g., filter noise from the signal) in order to enhance the detection of the tracer concentration. The communication can be either hard wired (e.g., electrical communication cable), a wireless communication (e.g., wireless RF interface), a pneumatic interface or the like. For example, the controller can communicate with a feed device in order to control the dosage of hardness abating agents based on the monitoring of the measurable amounts of inert fluorescent tracers.

The foregoing may be better understood by reference to the following Examples, which are presented for purposes of illustration and are not intended to limit the scope of the invention.

1. Test Protocol to Determine Product Stability Toward Dilution Water Hardness.
A) Equipment Needed
1) Turbidimeter and cell(s)—A Hach 2100AN has been used herein. The turbidity measurement may be done manually (i.e. recording the turbidity at specific elapse time) or it can be automated.
2) 100 mL beaker(s), magnetic stir bar and plate—This equipment will be used to prepare the dilutions.
3) 40 mL sample bottles with lids (10).
4) Graduate cylinder, 100 mL for example.
5) Graduated pipettes, 10 mL graduated at 1 mL minimum.

B) Test Procedure:
1) Dilution Rate of 50-Fold Volume-to-Volume as an Example
a) Measure 50 mL of mill water using a graduated cylinder into the 100 mL beaker and add a magnetic stir bar.
b) Place dilution water on stir plate and begin agitation. If the additive is to be added to the dilution water, this is the point at which the addition is made.
c) Measure 1 mL of "stabilized" silica-containing anionic microparticle-containing product into a weigh boat. Note: If a "stabilized" product is to be used, the additive is mixed with the silica-containing anionic microparticle-containing product prior to measuring 1 mL. Otherwise, the microparticle-containing product is used directly.
d) Transfer the sample from the weigh boat to the agitated beaker containing the mill water. Mix for 5-15 seconds.
e) Transfer diluted sample to a turbidimeter sample cell and insert the cell into the instrument.
f) Record turbidity every 30 seconds for 5 minutes or for the predetermined elapse time and given interval.
2) Dilution Rate of 100-Fold Volume-to-Volume as an Example
a) Measure 50 mL of mill water using a graduated cylinder into the 100 mL beaker and add a magnetic stir bar.
b) Place the dilution water on stir plate and begin agitation. If the additive is to be added to the dilution water, this is the point at which the addition is made.
c) Measure 0.50 mL of "stabilized" silica-containing anionic microparticle-containing product using a graduated pipette into a weigh boat. Note: If a "stabilized" product is to be used, the additive is mixed with the silica-containing anionic microparticle-containing product prior to measuring 1 mL. Otherwise, the microparticle-containing product is used directly.
d) Transfer the sample from the weigh boat to the agitated beaker containing the mill water. Mix for 5-15 seconds.
e) Transfer diluted sample to a turbidimeter sample cell and insert the cell into the instrument.
f) Record turbidity every 30 seconds for 5 minutes or for the predetermined elapse time and given interval.
2. Test Protocol to Determine Product Stability.
A) Room Temperature Stability Test. The product is placed in sealed plastic bottles filled to about 90% of the total volume and placed in a laboratory at 22° C. The product is stability is determined by recording the viscosity at preset intervals. The viscosity measurement may be done using a standard viscometer or by observing the fluidity of the sample upon inversion of the sealed sample bottle. The shelf life being determined when the product no longer flows.
B) Accelerated Product Stability Test at 40° C. This test is similar to that above with the exception that the product is placed in a forced circulation oven maintained at 40° C.
C) Accelerated Product Stability Testing at 50° C. This test is similar to that carried out above with the exception that the forced air oven is set at 50° C. The samples are placed in plastic containers, which can withstand exposure to temperature. The shelf life of the product as above is determined by monitoring viscosity.
3. Product Performance Test Protocol in Paper Making (Focused Beam Reflectance Measurement, FBRM).

Flocculation activity is measured by Focused Beam Reflectance Measurement (FBRM), also known as Scanning Laser Microscopy or SLM, using a Lasentec™ M500 (Lasentec, Redmond, Wash.). A description of the theory behind the operation of the FBRM can be found in Preikschat, F. K. and Preikschat, E., "Apparatus and method for particle analysis," U.S. Pat. No. 4,871,251, 1989, which is herein incorporated by reference. The following references are incorporated by reference and describe in detail how this technique is used to measure performance and how it correlates to paper machine experience: Gerli, A., Keiser, B. A., and Surya, P. I., "The use of focused beam reflectance measurement in the development of a new nanosize particle," Appita J., 54(1), 36-40(2001); Clemencon, I. and Gerli, A., "The effect of flocculant/microparticles retention programs on floc properties," Nord. Pulp Pap. Res. J., 14(1), 23-29(1999); Gerli, A., Oosterhof, F., and Keiser, B. A., "An inorganic nanosize particle—part of a new retention/dewatering system," Pap. Technol. (Bury, U. K.), 40(8), 41-45(1999).

The change in the number average chord length or MCL of the thin stock as a function of time is used to characterize a flocculation response. The change in MCL caused by addition of particulate correlates with the additive performance in the papermaking process with the greater the ΔMCL (change in mean chord length) indicating better performance. The peak change in MCL gives a representation of the speed and extent of flocculation under the test conditions.

In a typical experiment, a 300 mL sample of synthetic fine paper stock is poured into a 500 mL glass beaker and place on the Focused Beam Reflectance Measurement (FBRM) stand. Mixing is started at 710 rpm. Starch, flocculant and particulate are added as outlined in Table 1 entitled "Addition Sequence." The performance of the silica-containing anionic microparticle component of the retention program is measured as the MCL difference between the stock 6 seconds after addition of the microparticle component minus the MCL of the stock at the point of addition of the microparticle component. This is explained in detail in the references cited above.

TABLE 1

Addition Sequence
Addition Sequence

| Time(seconds) | Event |
| --- | --- |
| 0 | start mixing at 710 rpm |
| 15 | add 10 lb/ton Solvitose-N starch |
| 30 | add 3 lb/ton 61067 |
| 75 | add particulate |
| 120 | End Experiment |

4. Performance Evaluation as Measured using a Britt Jar.

Turbidity testing using the Britt Jar is known in the art. See, for example, Britt, K. W. (1973). "Mechanisms of retention during paper formation."Tappi 56(10): 46-50; Britt, K. W. (1973). "Retention of additives during sheet formation." Tappi 56(3): 83-6; and Britt, K. W. and J. E. Unbehend (1976). "New methods for monitoring retention." Tappi 59(2): 67-70.

In a typical procedure, the Britt Jar is filled with 500 mL of thin stock collected from the approach piping to the headbox of the paper machine. The thin stock sample was collected so that all additives with the exception of the silica-containing anionic microparticle product were present. The mill stock tested was a Fine Paper furnish consisting of 60% Hardwood, 10% thermomechanical pulp and 30% broke. It also contained 14% precipitated calcium carbonate. After mixing for 10 seconds, the silica-containing anionic microparticles were added and mixing continued for an additional 5 seconds. At that time the treated thin stock was transferred to The Alchem Drainage Tester and allowed to drain for 5 seconds. The Alchem Drainage Tester is available from Nalco Company. The filtrate turbidity was measured. Each silica-containing anionic microparticle product was added at 3 kg/t as product. The % retention improvement was calculated using the turbidity of the filtrate from the untreated thin stock sample as the reference.

5. Fine Paper Stock used in the Performance Testing.

An alkaline fine paper thin stock at 0.5 wt % consistency is prepared in the laboratory. The solids of the thin stock are composed of 32 wt % SWK, 48 wt % HWK, and 20 wt % ultra fine GCC (i.e. ground calcium carbonate). The SWK is prepared from dry lap obtained from a mill located in Alberta Canada, repulped in deionized water at 2-4 wt % consistency and beaten to a 360 mL Canadian Standard Freeness (CSF). The HWK is prepared separately from dry lap originating from a Northern US mill, repulped in deionized water at 2-3 wt % consistency, and beaten to 360 mL CSF. The filler is Ultrafine GCC obtained from Omyafil. The corresponding thick stocks and GCC are combined and diluted with deionized water containing 1.5 mM calcium, 0.74 mM magnesium, 2.2 mM sodium, 2.99 mM chloride, 0.75 mM sulfate and 2.2 mM bicarbonate. The thin stock is 0.5 wt % consistency, with a pH of 8.1 and a conductivity of 600 microS/cm.

Example 1

This example provides the formulas used to prepare synthetic dilution water of varying hardness that will be used in the following examples unless otherwise specified. The chemicals, calcium chloride, magnesium sulfate, and sodium bicarbonate are available as reagent grade from any standard chemical supply house such as Aldrich and Fischer Scientific and are used without further purification.

A solution of $CaCl_2.2H_2O$ having a concentration of 0.377M is prepared using deionized water. Similarly, concentrated solution of $MgSO_4.7H_2O$ and $NaHCO_3$ are prepared using deionized water to yield the following molarity respectively 0.187M and 0.550M. These "stock" solutions are then used in the preparation of 1-liter of synthetic dilution hard water of the specified hardness.

TABLE 2

| Concentrate | Vol of Conc (mL) | | |
| --- | --- | --- | --- |
| Solution | 310 | 450 | 600 |
| $CaCl_2 \cdot 2H_2O$ | 6.13 | 8.67 | 10.33 |
| $MgSO_4 \cdot 7H_2O$ | 3.96 | 6.59 | 11.43 |
| $NaHCO_3$ | 1.26 | 1.02 | 1.10 |

Representative hardness-abating additives used in the following examples are listed in Table 3.

TABLE 3

Representative Hardness-abating Additives

| Hardness-abating additive | Available From | Chemistry | Actives | MW |
| --- | --- | --- | --- | --- |
| PAA-1 | Nalco Company | poly acrylic acid, sodium salt | 25% | |

TABLE 3-continued

Representative Hardness-abating Additives

| Hardness-abating additive | Available From | Chemistry | Actives | MW |
|---|---|---|---|---|
| PAA-2 | Nalco Company | Proprietary anionic polymer, sodium salt | 25% | |
| CPAS-1 | Nalco Company | copolymer acrylic acid/styrene sulfonate (90:10), sodium salt | 29% | 36,500 |
| Goodrite K-752 | Noveon Inc.[1] | poly acrylic acid, sodium salt | 62% | 2,000 |
| PAA-3 | Aldrich | poly acrylic acid, sodium salt | 100% | 2,000 |
| AMPS | Aldrich | poly(2-acryloamido-2-methyl-1-propane sulfonic acid | 15% | 2,000,000 |
| TSP | J. T. Baker | tetrasodium pyrophosphate | 100% | N/A |
| NP780 | Eka Chemical | Aluminum modified colloidal silica | 8% | N/A |

[1] Noveon, Inc. 9911 Brecksville Road, Cleveland, OH.

Example 2

The anionic particle product used in this example is a colloidal silica product, hereinafter referred to as CS-A, available from Nalco Company, Naperville, Ill. It is characterized by 11.7% by weight silica, product pH of 10.48, an S-value of 38.8% and a surface area of 988 $m^2/g$. The product is diluted using synthetic dilution water of hardness 310 ppm as calcium carbonate. The turbidity of the dilution water with 310 ppm hardness is 0.500 NTU and the pH is 8.64. The water is placed in a beaker with a magnetic stir bar. The CS-A is added to the water, mixed for 5-15 seconds, and transferred to a Hach 2100AN Turbidimeter sample holder. The turbidity, NTU, is recorded at the indicated intervals. The diluted solution pH is measured using a Mettler Toledo MP220 pH meter with a standard combination electrode. The pH and turbidity are measured at room temperature, i.e. 20° C. Results are summarized in Table 4.

TABLE 4

| Volume add (mL) | | Dilution Ratio | Solution pH | observations Appearance | Turbidity (NTU) | | | |
|---|---|---|---|---|---|---|---|---|
| Product | Water | | | | 2 min | 60 min | 3 hours | 20 hours |
| 9.3 | 100 | 10.8 | 10.00 | clear | 6.98 | 6.78 | 6.44 | 6.91 |
| 4.6 | 100 | 21.6 | 9.66 | clear | 6.28 | 14.5 | 22.7 | 45.2 |
| 4.2 | 100 | 24.0 | 9.75 | clear | 10.3 | 48.6 | 47.4 | soft gel |
| 4.2 | 100 | 24.0 | 9.76 | clear | 9.60 | 47.2 | 48.7 | soft gel |
| 4.2 | 100 | 24.0 | 9.75 | clear | 9.32 | 44.0 | 49.1 | soft gel |
| 3.7 | 100 | 27.0 | 9.78 | haze to clear | 49.6 | 44.3 | settled | settled |
| 2.8 | 100 | 36.0 | 9.44 | turbid | 46.7 | 46.4 | settled | settled |
| 2.3 | 100 | 43.2 | 9.48 | turbid | 39.7 | 38.8 | settled | settled |
| 1.9 | 100 | 53.9 | 9.14 | turbid | 33.0 | 33.0 | settled | settled |

As shown in Table 4, the CS-A becomes immediately unstable after dilution with water having a hardness of 310 ppm above 27:1 or 27-fold dilution. Instability is delayed at lower dilution. Ultimately, the impact of the instability is gelation of the diluted product.

Example 3

The anionic particle product used in this study is that of Example 2, CS-A. The product is diluted using synthetic dilution water of hardness 450 ppm as calcium carbonate. The turbidity of the dilution water with 450 ppm hardness is 0.112 NTU and the pH is 8.80. The water is placed in a beaker with a magnetic stir bar. The CS-A is added to the water, mixed for 5-15 seconds, and transferred to a Hach 2100AN Turbidimeter sample holder. The turbidity, NTU, is recorded at the indicated intervals. The diluted solution pH is measured using a Mettler Toledo MP220 pH meter with a standard combination electrode. The pH and turbidity are measured at room temperature, i.e. 20° C. The results are summarized in Table 5.

TABLE 5

| Volume add (mL) | | Dilution Ratio | Solution pH | observations Appearance | Turbidity (NTU) | | | |
|---|---|---|---|---|---|---|---|---|
| Product | Water | | | | 2 min | 60 min | 3 hours | 20 hours |
| 9.3 | 100 | 10.8 | 10.05 | clear | 8.04 | 7.71 | 7.78 | 7.88 |
| 8.3 | 100 | 12.0 | 9.99 | clear | 7.19 | 7.52 | 8.23 | 9.77 |
| 7.4 | 100 | 13.5 | 9.81 | clear | 7.77 | 12.1 | 16.7 | 24.9 |
| 7.0 | 100 | 14.4 | 9.96 | slight haze | 9.65 | 28.1 | 40.0 | 61.6 |
| 7.0 | 100 | 14.4 | 9.90 | slight haze | 9.82 | 28.4 | 40.3 | 61.4 |
| 7.0 | 100 | 14.4 | 9.95 | slight haze | 9.26 | 27.0 | 38.6 | 60.4 |
| 6.5 | 100 | 15.4 | 9.96 | haze to clear | 16.9 | 74.5 | 83.0 | hard gel |

TABLE 5-continued

| Volume add (mL) | | Dilution Ratio | Solution observations | | Turbidity (NTU) | | | |
|---|---|---|---|---|---|---|---|---|
| Product | Water | | pH | Appearance | 2 min | 60 min | 3 hours | 20 hours |
| 5.6 | 100 | 18.0 | 9.96 | turbid | 78.4 | 68.4 | 68.3 | soft gel |
| 4.6 | 100 | 21.6 | 9.69 | turbid | 73.7 | 74.3 | settled | settled |

Table 5 shows that in the case of dilution with water having a hardness of 450 ppm as calcium carbonate the onset of instability occurs at lower dilution ratio as compared to using 310 ppm hard water. When the dilution water contains 450 ppm hardness as calcium carbonate, the maximum dilution ratio is 13.5-fold.

Example 4

The anionic particle product used in this study is that of Example 2, CS-A. The product is diluted using synthetic dilution water of hardness 600 ppm as calcium carbonate. The turbidity of the dilution water with 600 ppm hardness is 0.135 NTU and the pH is 8.86. The water is placed in a beaker with a magnetic stir bar. The CS-A is added to the water, mixed for 5-15 seconds, and transferred to a Hach 2100AN Turbidimeter sample holder. The turbidity, NTU, is recorded at the indicated intervals. The diluted solution pH is measured using a Mettler Toledo MP220 pH meter with a standard combination electrode. The pH and turbidity are measured at room temperature, i.e. 20° C. The results are summarized in Table 6.

TABLE 6

| Volume add (mL) | | Dilution Ratio | Solution observations | | Turbidity (NTU) | | | |
|---|---|---|---|---|---|---|---|---|
| Product | Water | | pH | Appearance | 2 min | 60 min | 3 hours | 20 hours |
| 11.1 | 100 | 9.0 | 10.12 | clear | 10.7 | 13.3 | 14.7 | 15.2 |
| 10.2 | 100 | 9.8 | 10.11 | clear | 12.7 | 24.6 | 27.7 | 31.9 |
| 9.7 | 100 | 10.3 | 10.07 | clear | 17.7 | 45.3 | 53.1 | 61.4 |
| 9.7 | 100 | 10.3 | 10.04 | clear | 17.5 | 45.2 | 53.1 | 61.0 |
| 9.7 | 100 | 10.3 | 10.05 | clear | 16.8 | 42.4 | 50.8 | 58.8 |
| 9.3 | 100 | 10.8 | 10.11 | hazy | 22.3 | 78.4 | 85.0 | 90.5 |
| 8.8 | 100 | 11.4 | 10.01 | hazy | 45.6 | 108.0 | N/A | hard gel |
| 8.3 | 100 | 12.0 | 10.12 | turbid | 86.0 | N/A | N/A | hard gel |

As in the examples above, the data in Table 6 shows that as the hardness of the dilution water increases, the maximum dilution ratio that can be employed without destabilization of the product decreases. In the case of 600 ppm hard water, the maximum dilution ratio is around 10-fold.

Example 5

The anionic particle product used in this study is that of Example 2, CS-A. The product is diluted using synthetic dilution water as indicated in the table below. The appropriate amount of hardness-abating additive listed in the table is combined with sufficient dilution water to yield a solution of the additive totally 100 g. As indicated, some solutions are prepared by adding the hardness-abating additive to the CS-A prior to dilution (see table below). In either case, the water (with or without hardness-abating additive) is placed in a beaker with a magnetic stir bar. The CS-A (without or with hardness-abating additive) is added to the water, mixed for 5-15 seconds, and transferred to a Hach 2100AN Turbidimeter sample holder. The turbidity, NTU, is recorded at the indicated intervals. For details on the hardness-abating additives, please see Table 3. BOP is used in this table to mean "based on polymer". The results are shown in Table 7.

TABLE 7

| water hardness | Dilution Ratio | Hardness-abating additive | Hardness-abating additive (BOP) | | Turbidity (NTU) | | | |
|---|---|---|---|---|---|---|---|---|
| | | | ppm Soln | wt % Prod | 2 min | 30 min | 60 min | 23 hours |
| 310 | 27.0 | PAA-1 | 95 | 0.25 | 12.6 | 46.6 | 44.4 | settled |
| 310 | 27.0 | PSO-1 | 95 | 0.25 | 25.3 | 45.9 | 41.7 | settled |
| 310 | 27.0 | CPAS-1 | 95 | 0.25 | 18.4 | 45.8 | 41.6 | settled |
| 310 | 27.0 | DI Water | 95 | 0.25 | 45.0 | 42.9 | gel | settled |
| 310 | 27.0 | PAA-1 | 189 | 0.50 | 6.34 | 14.5 | 20.5 | gel |
| 310 | 27.0 | PSO-1 | 189 | 0.50 | 9.31 | 42.6 | 46.8 | gel |
| 310 | 27.0 | CPAS-1 | 189 | 0.50 | 8.95 | 38.7 | 44.3 | gel |
| 310 | 27.0 | PAA-1 in sol | 189 | 0.50 | 5.91 | 13.6 | 19.5 | gel |
| 310 | 27.0 | PSO-1 in sol | 189 | 0.50 | 8.95 | 39.7 | 45.4 | gel |
| 310 | 27.0 | CPAS-1 in sol | 189 | 0.50 | 9.68 | 41.7 | 45.4 | gel |
| 310 | 27.0 | PAA-1 in sol | 280 | 0.75 | 4.74 | 5.31 | 6.10 | 19.9 |
| 310 | 27.0 | PSO-1 in sol | 280 | 0.75 | 17.6 | 17.6 | 26.0 | gel |
| 310 | 27.0 | CPAS-1 in sol | 280 | 0.75 | 15.3 | 15.3 | 23.1 | gel |

TABLE 7-continued

| water hardness | Dilution Ratio | Hardness-abating additive | Hardness-abating additive (BOP) ppm Soln | wt % Prod | Turbidity (NTU) 2 min | 30 min | 60 min | 23 hours |
|---|---|---|---|---|---|---|---|---|
| 310 | 27.0 | DI Water | 280 | 0.75 | 43.9 | 43.9 | 41.9 | settled |
| 600 | 10.8 | PAA-1 in sol | 638 | 0.75 | 8.72 | 8.72 | 9.06 | 13.5 |

Note:
"Soln" is defined as the final diluted material containing the hardness-abating additive, anionic particles and water. "Product" refers to only the anionic particle-containing dispersion and in this specific case represents the amount needed in the product to reach the corresponding concentration of the hardness-abating additive when diluted.

It is apparent from the data shown in Table 7 that while all the hardness-abating additives shown serve to stabilize the anionic particles upon dilution with hard water, the PAA-1 shows higher effectiveness. Also shown in the table above is that the hardness-abating additive can be combined with the anionic particle-containing product and still stabilize the particles. At 638 ppm BOP, PAA-1 stabilizes the resulting diluted anionic particles for more than one hour.

Example 6

The anionic particle product used in this study is that of Example 2, CS-A. The product is diluted using synthetic dilution water of hardness 600 ppm as calcium carbonate. The turbidity of the dilution water with 600 ppm hardness is 0.135 NTU and the pH is 8.86. PAA-1 is used in this example and is added to CS-A at the listed weight percent with mixing. After mixing, the appropriate amount of the "stabilized" CS-A is added to the dilution water agitated with a magnetic stir bar and mixed for 5-15 seconds. Subsequently, the dilute solution is transferred to a Hach 2100AN Turbidimeter sample holder. The turbidity, NTU, is recorded at the indicated intervals. For details on the hardness-abating additives, please see Table 3. BOP is used in this table to mean "based on polymer". The results are shown in Table 8

TABLE 8

| water hardness | Dilution Ratio | Hardness-abating additive Product | Sol wt % | Dil Soln ppm BOP | Turbidity (NTU) 2 min | 2 Hrs | 3.5 Hrs | 20 Hrs |
|---|---|---|---|---|---|---|---|---|
| 600 | 10.8 | PAA-1 | 1.0 | 227 | gel | | | |
| 600 | 10.8 | PAA-1 | 1.5 | 341 | 4.76 | 56.2 | gel | gel |
| 600 | 10.8 | PAA-1 | 2.0 | 455 | 4.68 | 47.9 | 54.2 | gel |
| 600 | 10.8 | PAA-1 | 2.6 | 591 | 4.26 | 4.36 | 4.40 | 5.09 |

This example shows that PAA-1 can be combined with the anionic particle-containing product prior to dilution with hard water and unexpectedly improve the stability in excess of 20 hours.

Example 7

Performance as part of a retention program during the formation of paper is evaluated based upon flocculation quantified by Focused Beam Reflectance Measurement or FBRM as described above.

A synthetic alkaline fine paper thin stock is prepared at 0.5 wt % consistency and used in the evaluation. The solids of the thin stock are composed of 32 wt % SWK, 48 wt % HWK, and 20 wt % Ultrafine GCC. The SWK is prepared from dry lap obtained from a mill located in Alberta Canada, repulped in deionized water at 2-4 wt % consistency and beaten to a 360 mL Canadian Standard Freeness (CSF). The HWK is prepared separately from dry lap originating from a Northern US mill, repulped in deionized water at 2-3 wt % consistency, and beaten to 360 mL CSF. The filler is Ultrafine GCC obtained from Omyafil. The corresponding thick stocks and GCC are combined and diluted with deionized water containing 1.5 mM calcium, 0.74 mM magnesium, 2.2 mM sodium, 2.99 mM chloride, 0.75 mM sulfate and 2.2 mM bicarbonate. The thin stock is 0.5 wt % consistency, with a pH of 8.1 and a conductivity of 600 microS/cm.

Other retention program additives included cationic starch and flocculant. The cationic starch used herein is Solvitose N and is available from Avebe, Prins Hendrikplein 20, 9641 GK Veendam, The Netherlands. The flocculant used is 61067 that is a commercial product that can be obtained from Nalco Company, 1601 West Diehl Road, Naperville, Ill. 60563. The starch dose is constant throughout the test at 10 lb/t based on product. The 61067 dose is likewise held constant throughout the tests at 3 lb/t based on product.

The anionic particle-containing product used in this study is CS-A. The product is diluted 27-fold with hard water as shown in the attached table below. Hardness-abating additive PAA-1 is added to the CS-A prior to dilution at the wt % level shown in the table below. Deionized water is substituted for the "Hardness-abating additive" addition as a control. A portion of the diluted solution is placed in a Hach 2100AN Turbidimeter and the turbidity measured at timed intervals after dilution. Simultaneously, timed performance studies are carried out. The addition scheme is shown below. The FBRM experiment is carried out using 300 mL of thin stock mixed at 710 rpm. Data is collected using a sampling time of 3 second with no averaging. Chord lengths are measured from 1 to 1000μ and displayed over 90 channels logarithmically. The change in mean chord length resulting from the addition of the anionic particle containing dilute solution is calculated and recorded. It has been shown that the higher the change, the better the performance. The results are shown in Tables 9 and 10.

TABLE 9

Turbidity of Dilute Solutions

| Elapse time (min) | Turbidity (NTU) | | | | | | | |
|---|---|---|---|---|---|---|---|---|
| | 310(H2O) | 310(0.75) | 310(0.5) | 310(0.25) | 450(H2O) | 450(1.5) | 600(H2O) | 600(2.0) |
| 2 | 51.7 | 4.42 | 4.64 | 6.75 | 61.7 | 12.7 | 64.0 | 24.9 |
| 5 | 52.4 | 4.23 | 4.61 | 7.64 | 61.5 | 12.6 | 64.1 | 27.7 |
| 10 | 52.8 | 4.15 | 4.75 | 9.11 | 61.7 | 12.5 | 63.6 | 31.7 |
| 15 | 52.9 | 4.13 | 4.95 | 10.4 | 61.8 | 12.6 | 62.5 | 35.6 |
| 20 | 52.9 | 4.09 | 5.16 | 11.7 | 62.1 | 12.6 | 61.5 | 39.2 |
| 25 | | 4.10 | 5.36 | 13.0 | 61.3 | 12.6 | 61.2 | 43.0 |
| 30 | 52.9 | 4.07 | 5.58 | 14.2 | 60.2 | 12.7 | 61.5 | 46.5 |
| 35 | | 4.23 | 5.76 | 15.4 | 59.8 | 12.8 | 61.1 | 49.8 |
| 40 | | 4.21 | 5.94 | 16.5 | 59.0 | 12.8 | 60.8 | 52.8 |
| 45 | | 4.18 | 6.09 | 17.9 | 57.8 | 12.9 | 61.3 | 55.5 |
| 50 | | 4.17 | 6.26 | 19.1 | | 13.0 | 61.8 | 58.0 |
| 55 | | 4.18 | 6.43 | 20.5 | | | 62.2 | 60.2 |
| 60 | 46.7 | 4.16 | 6.59 | 22.0 | | | 62.1 | 62.0 |
| 72 | | | | 25.5 | | | | |
| 85 | | | | | | | 63.1 | |

Table Note:
The sample code is dilution water hardness(dose of PAA-1 as wt % to CS-A). For example: 310(0.75) means that CS-A is treated with 0.75 wt % as product PAA-1 and then diluted 27-fold with water having a hardness of 310 ppm as calcium carbonate.

As shown in Table 9, when 310 ppm hard water is used, 0.5 wt % PAA-1 is sufficient to provide temporary stability to the dispersion. In contrast, 1.5 wt % is needed when 450 ppm hard water is used.

TABLE 10

ΔMCL with time and dilution water hardness
Hardness-abating additive (ppm BOP)

| | 0 | | | | | | 0.75 | | 1.50 | | 2.00 | |
|---|---|---|---|---|---|---|---|---|---|---|---|---|
| Elapse Time | DI water | Elapse Time | 310 | Elapse Time | 450 | Elapse Time | 600 | Elapse Time | 310 | Elapse Time | 450 | Elapse Time | 600 |
| 3 | 8.40 | 3 | 8.81 | 0 | 9.81 | 0 | 9.34 | 0 | 8.55 | 0 | 9.34 | 0 | 9.60 |
| 6 | 9.09 | 6 | 10.35 | 5 | 9.37 | 5 | 8.71 | 6 | 8.44 | 5 | 9.88 | 6 | 10.39 |
| 10 | 9.22 | 15 | 10.53 | 11 | 6.13 | 11 | 6.79 | 12 | 8.70 | 11 | 10.12 | 11 | 9.91 |
| 173 | 8.58 | 49 | 3.94 | 35 | 3.47 | 40 | 2.56 | 9 | 9.50 | 44 | 9.95 | 31 | 10.39 |
| 372 | 9.23 | | | | | | | 29 | 8.67 | | | | |
| 388 | 8.77 | | | | | | | 33 | 8.96 | | | | |
| | | | | | | | | 35 | 8.21 | | | | |
| | | | | | | | | 57 | 8.35 | | | | |
| | | | | | | | | 61 | 8.49 | | | | |
| | | | | | | | | 65 | 8.10 | | | | |

Table Note:
Elapse Time is recorded in minutes. The column heading is water hardness in ppm as calcium carbonate, e.g. 310 = 310 ppm water hardness as calcium carbonate.

As shown in Table 10, the performance of the anionic particle-containing solution is negatively impacted by water hardness of the dilution water. This impact increases with the water hardness. The introduction of hardness-abating additive of this invention serves to stabilize the anionic particles and thereby preserve the performance as can be seen comparing that diluted with 310 ppm water hardness with and without hardness-abating additive.

Example 8 the anionic particle product used in this study is CS-B. CS-B is characterized as having 12.3% by weight $SiO_2$, an S-value of 42.5% and surface area of 902 $m^2/g$. The product is diluted using synthetic dilution water of hardness 310 ppm as calcium carbonate. The turbidity of the dilution water with 310 ppm hardness is 0.500 NTU and the pH is 8.64. TSP, tetrasodium pyrophosphate, is used as received from J.T. Baker Chemical Company. The TSP is added to a mixed volume of CS-B to yield an addition level of 1% by weight. After the TSP dissolved, the appropriate amount of the "stabilized" CS-B is added to the water agitated with a magnetic stir bar and mixed for 5 seconds. Subsequently, the dilute solution is transferred to a Hach 2100AN Turbidimeter sample holder. The turbidity, NTU, is recorded at the indicated intervals. For details on the hardness-abating additives, please see Table 3. The results are shown in table 11.

TABLE 11

| Water Hardness | 310 | 310 |
|---|---|---|
| Dil Ratio (v/v) | 28 | 28 |
| Time (min) | Sol | TSP (1%) |
| 1 | 4.27 | 3.30 |
| 2 | 4.47 | 3.24 |
| 3 | 4.70 | 3.25 |
| 4 | 4.91 | 3.61 |
| 5 | 5.00 | 3.34 |
| 10 | 5.74 | 3.59 |
| 15 | 6.30 | 4.15 |
| 20 | 6.80 | 4.87 |

TABLE 11-continued

| | | |
|---|---|---|
| 25 | 7.25 | 5.41 |
| 30 | 7.64 | 5.71 |
| 35 | | 5.87 |
| 40 | | 5.90 |
| 45 | | 5.92 |
| 50 | | 5.93 |
| 55 | | 5.95 |
| 60 | | 5.96 |

As can be seen from table 11, the TSP containing composition of this invention provides stability of the anionic particles for 60 minutes compared to the untreated anionic particles.

Example 9

The anionic particles product used in this study is CS-B, as used in Example 8 above. The product is diluted using synthetic dilution water of hardness 310 ppm as calcium carbonate. The dilution water use for each solution is listed in the table below. The various "Hardness-abating additives" used are indicated in the table along with the dose. A description and the source can be found in Table 3. The hardness-abating additive is added to a mixed volume of CS-B to yield the addition level indicated in the table. Subsequently, the appropriate amount of the "stabilized" CS-B is added to the dilution water agitated with a magnetic stir bar and mixed for 5 seconds. Subsequently, the dilute solution is transferred to a Hach 2100AN Turbidimeter sample holder. The turbidity, NTU, is recorded at the indicated intervals. The results are shown in Table 12 and 13.

TABLE 12

| Additive | PAA-3 | PAA-3 | PAA-3 | PAA-3 | CPAS-1 | CPAS-1 | CPAS-1 | AMPS | AMPS |
|---|---|---|---|---|---|---|---|---|---|
| Level (wt %) | 1.0 | 1.0 | 0.5 | 1.0 | 2.5 | 2.5 | 1.0 | 1.0 | 6.7 |
| Dilution Ratio (v/v) | 55 | 109 | 55 | 55 | 55 | 109 | 55 | 55 | 55 |
| Water Hardness | 310 | 310 | 310 | 450 | 310 | 310 | 310 | 310 | 310 |
| Elapse Time (min) | | | | | Turbidity (NTU) | | | | |
| 0.00 | 2.55 | 1.89 | 36.6 | 10.7 | 4.27 | 22.6 | 33.9 | 35.6 | 9.10 |
| 2.00 | 2.37 | 1.89 | 35.8 | 15.2 | 4.61 | 21.8 | 33.0 | 35.0 | 10.4 |
| 4.00 | 2.36 | 1.91 | 35.5 | 18.6 | 4.86 | 21.4 | 32.6 | 34.6 | 10.8 |
| 6.00 | 2.38 | 1.89 | 35.3 | 21.6 | 5.11 | 21.2 | 32.4 | 34.4 | 11.3 |
| 8.00 | 2.34 | 1.88 | 35.2 | 24.4 | 5.34 | 21.0 | 32.2 | 34.3 | 11.7 |
| 10.00 | 2.35 | 1.87 | 35.1 | 26.8 | 5.55 | 20.9 | 32.0 | 34.2 | 12.2 |
| 12.00 | 2.38 | 1.91 | 35.1 | 27.5 | 5.81 | 20.8 | 31.9 | 34.3 | 12.6 |
| 14.00 | 2.38 | 1.91 | 35.0 | 29.9 | 6.09 | 20.8 | 31.8 | 34.3 | 13.2 |
| 16.00 | 2.39 | 1.95 | 35.0 | 32.0 | 6.38 | 20.7 | 31.8 | 34.4 | 13.7 |
| 18.00 | 2.42 | 1.95 | 34.9 | 33.6 | 6.69 | 20.6 | 31.7 | 34.5 | 14.2 |
| 20.00 | 2.44 | 2.02 | 34.9 | 34.6 | 6.99 | 20.6 | 31.7 | 34.6 | 14.7 |

The data in Table 12 demonstrates that various "Hardness-abating additives" of this invention can be formulated with the anionic particle-containing product to provide particle stability as compared to the corresponding results obtained when untreated CS-B is diluted (see Table 13 below).

TABLE 13

| Water Hardness | 310 | 310 | | 450 |
|---|---|---|---|---|
| Dilution Ratio (v/v) | 55 | 109 | Elapse | 55 |
| Elapse Time (min) | Turbidity (NTU) | | Time (min) | Turbidity (NTU) |
| 1 | 35.8 | 19.1 | 0 | 39.1 |
| 2 | 35.3 | 18.5 | 5 | 39.1 |
| 3 | 35 | 18.3 | 10 | 39.1 |
| 4 | 34.8 | 18.1 | 15 | 39.1 |
| 5 | 34.7 | 18 | 20 | 39.1 |
| 10 | 34.3 | 17.4 | | |
| 15 | 34.1 | 17.2 | | |
| 20 | 34.1 | 17.3 | | |

Example 10

The anionic particle product used in this study is CS-B, as used in Example 8 above. A blend is prepared consisting of 10 g CS-B, 0.1 g of CPAS-1, 0.1 g of Goodrite K-752, and 2 g of deionized water. A description and the source of the hardness-abating additives can be found in Table 3. The product is diluted 55-fold with the appropriate synthetic dilution water for 5 seconds. Subsequently, the dilute solution is transferred to a Hach 2100AN Turbidimeter sample holder. The turbidity, NTU, is recorded at the indicated intervals. The results are listed in the Table 14 below.

TABLE 14

| Sample | CS-B | | | Stabilized Blend | | |
|---|---|---|---|---|---|---|
| Water Hardness | 310 | Elapse | 450 | Elapse | 310 | 450 |
| Dilution Ratio (v/v) | 55 | Time | 55 | Time | 55 | 55 |
| Elapse Time (min) | NTU | (min) | NTU | (min) | NTU | NTU |
| 1 | 35.8 | 0 | 39.1 | 0 | 2.41 | 2.72 |
| 2 | 35.3 | 5 | 39.1 | 2 | 2.09 | 2.65 |
| 3 | 35 | 10 | 39.1 | 4 | 2.03 | 2.77 |
| 4 | 34.8 | 15 | 39.1 | 6 | 2 | 2.77 |
| 5 | 34.7 | 20 | 39.1 | 8 | 1.96 | 2.86 |
| 10 | 34.3 | | | 10 | 1.97 | 2.91 |
| 15 | 34.1 | | | 12 | 1.95 | 2.98 |
| 20 | 34.1 | | | 14 | 1.94 | 3.06 |
| | | | | 16 | 1.93 | 3.14 |
| | | | | 18 | 1.93 | 3.25 |
| | | | | 20 | 1.95 | 3.34 |

The results in Table 14 show that the hardness-abating additives of this invention unexpectedly stabilized the anionic particles upon dilution with hard water.

Example 11

A drainage comparison test is carried out at a mill producing paper containing 60% hardwood, 10% thermomechanical pulp and 30% broke. In addition it contains 14% calcium carbonate filler. The drainage program include cationic starch at 0.8% by weight. A sample of the thin stock is taken from the approach system to the headbox after the cleaners and used to evaluate the various anionic particle-containing products.

The 500 mL of thin stock is placed in a baffled-jar with a three-propeller mixer attached. The speed of the agitator is set at 1000 rpm. The test consisted of mixing the thin stock for 10 seconds, at which time the diluted anionic particle-containing products are added at a constant dose of 6 lb/t as product. Mixing is continued for an additional 5 seconds. The treated thin stock is then transferred to an Alechem Drainage Tester and the filtrate is collected for 5 seconds. The filtrate volume is measured and recorded. The percent drainage improvement is calculated by comparing the treated filtrate volume to that of the untreated thin stock. The Alchem Drainage Tester can be obtained from Nalco Company. The results are provided in the table below.

The anionic particle product used in this study is CS-T. CS-T is typically characterized by 11.6% by weight $SiO_2$, an S-value of 36%, and a surface area of 1000 $m^2/g$. A blend is prepared consisting of 10 g of CS-T, 0.1 g of CPAS-1, 0.1 g of Goodrite K-752, and 2 g of deionized water (identified below as "Stabilized CS"). A description and the source of the hardness-abating additives can be found in Table 3. The product is diluted 10-fold with one of the following water sources available at the mill; deionized, well, or clarified water. The results are shown in Table 15.

TABLE 15

| Sample Description | Dilution Water | Drainage Improvement (%) |
|---|---|---|
| CS-T | Deionized Water | 20.95 |
| Stabilized CS | Deionized Water | 19.05 |
| EKA NP 780 | Deionized Water | 7.62 |
| CS-T | Well Water | 1.90 |
| Stabilized CS | Well Water | 14.29 |
| EKA NP 780 | Well Water | 4.76 |
| CS-T | Clarified Water | 4.76 |
| Stabilized CS | Clarified Water | 17.14 |
| EKA NP 780 | Clarified Water | 2.86 |

The results in Table 15 first show that the dilution water type impacts the drainage performance of the anionic particle-containing product as is seen by examining CS-T and NP780. Second, the results show that the hardness-abating additives and compositions of this invention when used reduce the impact of variations in dilution water hardness on the resulting drainage of the treated thin stock. NP 780 is aluminum-modified colloidal silica product. Unexpectedly, the composition of the current invention shows less dilution water dependence on drainage performance as compared to the aluminum-modified colloidal silica.

Various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A method of stabilizing silica-containing anionic microparticles, the method comprising the steps of:
    adding an effective stabilizing amount of one or more hardness-abating agents to the silica-containing anionic microparticles prior to mixing of hard water with the silica-containing anionic microparticles, the hard water having a hardness of at least 60 ppm as calcium carbonate polyvalent cations,
    wherein the hardness-abating agent is poly(2-acrylamido-2-methyl-1-propane sulfonic acid) having a molecular weight of about 2,000,000.

2. The method of claim 1 wherein the silica-containing anionic particles are selected from colloidal silica, polysilicate microgels, colloidal silicic acid, aluminum-modified colloidal silica, polyaluminumsilicate microgels, colloidal aluminosilicic acid, colloidal aluminosilicate, natural and synthetic colloidal zeolites, and natural and synthetic phyllosilicates.

3. The method of claim 2 wherein the silica-containing anionic microparticle is colloidal silica.

4. The method of claim 1 wherein one or more inert fluorescent tracers or the inherent fluorescence of the hardness-abating additive are used to trace and monitor the hardness abating additives.

5. The method of claim 1 wherein the silica-containing anionic microparticles are present in an amount sufficient to improve the retention and dewatering programs of a papermaking process.

6. The method of claim 5 in which the ratio of water to silica-containing anionic microparticles are within the range of between 25:1 to 200:1.

* * * * *